US006569291B1

United States Patent
Knoche

(10) Patent No.: US 6,569,291 B1
(45) Date of Patent: May 27, 2003

(54) LIQUID DISTRIBUTOR FOR SEPARATION COLUMNS

(75) Inventor: Martin Knoche, Öhningen (DE)

(73) Assignee: Sulzer Chemtech AG, Winterthur (CH)

( * ) Notice: Subject to any disclaimer, the term of this patent is extended or adjusted under 35 U.S.C. 154(b) by 0 days.

(21) Appl. No.: 09/287,680

(22) Filed: Apr. 6, 1999

(30) Foreign Application Priority Data

Apr. 9, 1998 (EP) .............................................. 98810307

(51) Int. Cl.[7] .................................................. B01D 3/14
(52) U.S. Cl. ........................ 202/158; 422/195; 422/220; 422/224; 239/499; 239/601; 239/602; 261/97
(58) Field of Search .......................... 202/158; 239/499, 239/504, 519, 601, 602; 261/97, 114.1; 422/113, 195, 196, 220, 224

(56) References Cited

U.S. PATENT DOCUMENTS

| 4,159,291 A | * | 6/1979 | Bruckert et al. | .......... | 261/114.1 |
| 4,378,187 A | * | 3/1983 | Fullerton | .................... | 411/267 |
| 5,054,547 A | * | 10/1991 | Shipley | ....................... | 165/115 |
| 5,139,544 A | * | 8/1992 | Lucero et al. | ................. | 95/211 |

FOREIGN PATENT DOCUMENTS

| DD | 248 419 A1 | 8/1987 |
| GB | 675874 | 7/1952 |
| WO | WO 90/14879 | 12/1990 |

OTHER PUBLICATIONS

Soviet Patent Abstracts, Week 933122. Sep. 1993, Derwent Publications Ltd., London, GB; AN 93248928, & SU 1 754 184 A (Rubezan Sect Dnepr Chem Techn Inst) Aug. 15, 1992, Abstract.

* cited by examiner

Primary Examiner—Glenn Caldarola
Assistant Examiner—Basia Ridley
(74) Attorney, Agent, or Firm—William Michael Hynes; Townsend and Townsend and Crew, LLP

(57) ABSTRACT

The liquid distributor (2) for columns (1) comprises at least one tub shaped or tubular part (3) of a rigid material. Outflow elements (4) of yielding, in particular elastomeric material are tightly inserted into apertures (30) of the tub shaped or tubular part. A liquid (6) to be distributed can flow off in each case through at least one opening (40) in the outflow element. This opening has a precisely predeterminable geometry.

10 Claims, 3 Drawing Sheets

LIQUID DISTRIBUTOR FOR SEPARATION COLUMNS

The invention relates to a liquid distributor for separation columns, to an outflow element for a distributor of this kind and to a column with the distributor.

BACKGROUND OF THE INVENTION

In substance exchange processes with for example sulfuric acid, nitric acid, chloroacetic acid or formic acid, materials are to be used for liquid distributors which are resistant to the named highly corrosive substances. Distributors come under consideration which are manufactured of a ceramic material or of a casting material such as for example iron silicon spheroidal graphite. Known ceramic distributors or distributors of a casting material produce a poor liquid distribution however due to the unfavorable and non-uniform geometry of the outflow holes: The holes have diameters which are considerably smaller than the wall thickness of the distributors so that shrinkage effects can be mastered only poorly. The hole diameters have a scatter about an average value (by about 3% in a ceramic material). A follow-up treatment by means of grinding out in order to obtain uniform diameters is complicated and expensive and can not be provided for reasons of cost.

In columns with structured (ordered) packings, but also with poured filler bodies, a uniform liquid distribution is essential for their ideal functioning.

SUMMARY OF THE INVENTION

The object of the invention is therefore to provide a distributor in particular for highly corrosive liquids, for the outflow holes of which a uniform and flow-technically favorable geometry can be predetermined.

The liquid distributor for columns comprises at least one tub shaped or tubular part of a rigid material. Outflow elements of yielding, in particular elastomeric material are set tightly into apertures of the tub shaped or tubular part. A fluid to be distributed can in each case flow off through at least one opening in the outflow element. This opening has a precisely predetermined geometry. Thanks to their yielding, the outflow elements can be inserted tightly into the apertures in spite of their geometric irregularities. In this the geometry of the outlet openings remains largely unimpaired.

Advantageous embodiments of the distributor are set forth. An outflow element is disclosed. Further, a column with distributor is set forth in accordance with the invention.

The solution in accordance with the invention can also be advantageously used in columns in which metallic liquid distributors are usually used.

For load changes it was previously necessary to replace the entire distributor. In the distributor in accordance with the invention the outflow elements can be installed by means of push connections into apertures of tub shaped or tubular parts. The push connection permits a rapid replacement so that instead of the entire distributor only the outflow elements need be replaced.

BRIEF DESCRIPTION OF THE DRAWINGS

The invention will be explained in the following with reference to the drawings. Shown are.

DESCRIPTION OF THE SPECIFIC EMBODIMENTS

Figure 1:
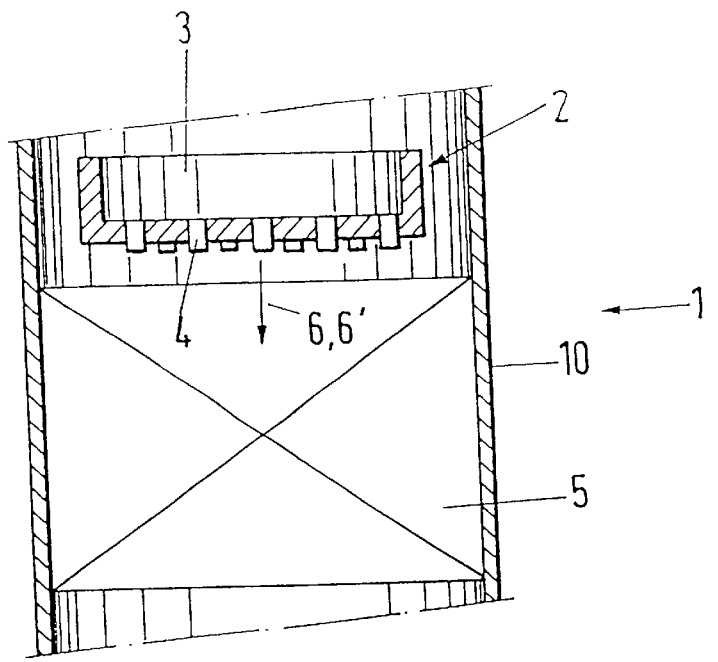
FIG. 1 is a schematic illustration of a section of a column with a liquid distributor in accordance with the invention.

The column 1 illustrated in section in FIG. 1 comprises within a column wall 10 a distributor 2 with a tub shaped part 3 and outflow elements 4, which is arranged above a packing section 5. In the column 1 a material and heat exchange can be carried out between a liquid 6 to be distributed (outflow direction 6') and a second fluid medium, in particular a gas. In this the outflow elements 4 are arranged in a regular pattern which is matched to the structure of the packing 5. The outflow elements 4 form base holes in FIG. 1; they can however also be provided as outlet holes which are arranged laterally in the distributor 2.

The outflow elements 4 of the distributor 2 in accordance with the invention are particularly suitable for thick-walled ceramic tub shaped parts 3. They are—see FIG. 2—inserted into apertures 30, of which the cross-sections contract or else remain constant in the outflow direction 6'. In the case of a contraction, a simple sealing off between the aperture and the outflow element 4 results at the contact surface. Sealing rings can however also be provided as additional components of the outflow elements 4.

At high operating temperatures the material of the outflow elements 4 becomes as a rule particularly yielding. The rigid material of the tub shaped part 3 however then provides a good support thanks to which the geometrical properties and the positioning of the outflow elements 4 are largely preserved.

Figure 2:
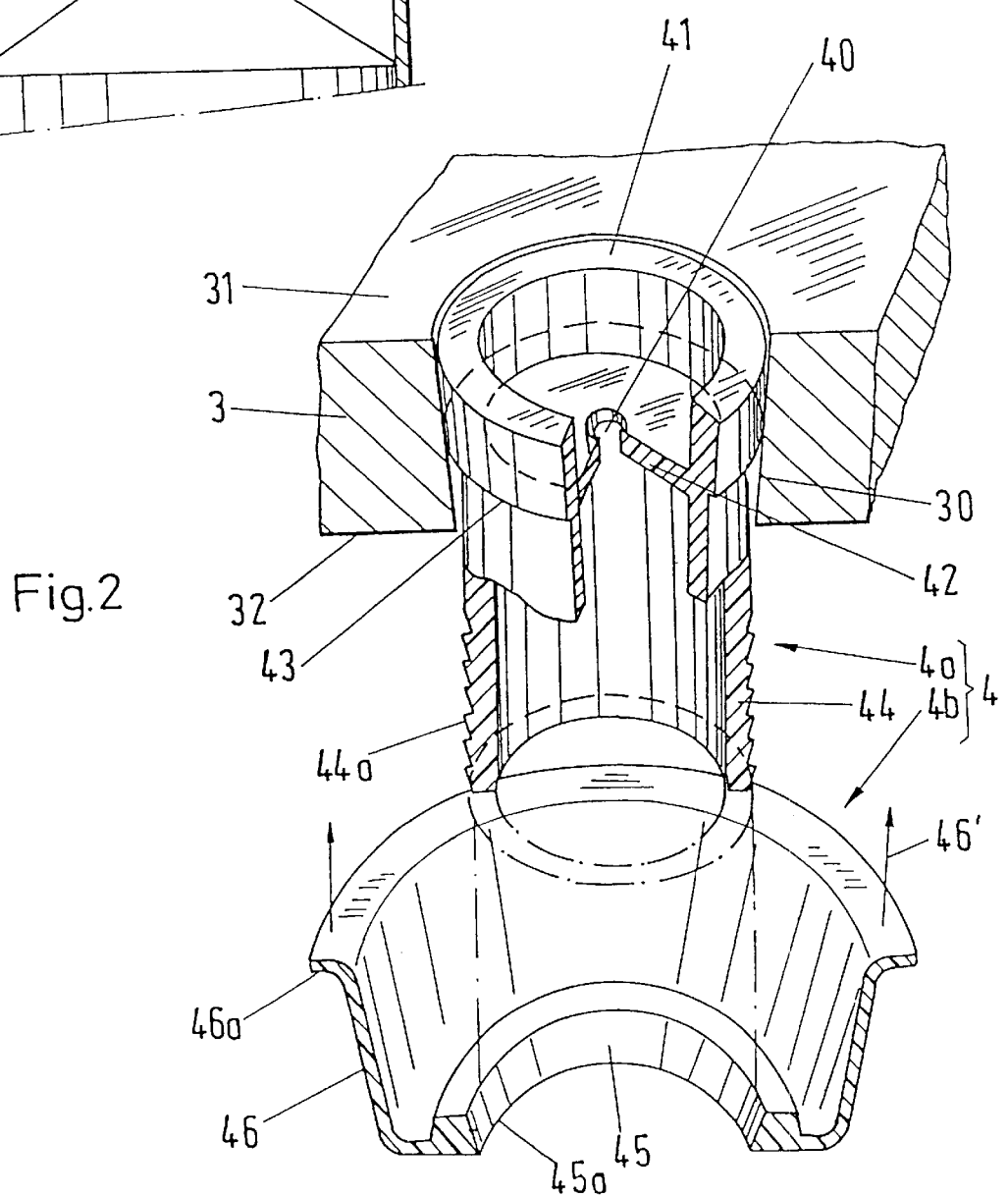
FIG. 2 perspective view of a two part outflow element illustrated in FIG. 1.

The outflow element 4 of FIGS. 2 is assembled from an entry-side part 4a and an fixing part 4b which is formed as a fixing part. The part 4a is inserted into the aperture 30 from the upper side 31 of the tub 3, the side of the fluid entry. The part 4a is formed with a pot shaped depression 41 at the entry side, in the base 42 of which an outflow opening 40 is arranged. This part 4a is advantageously manufactured of an elastomeric plastic—for example of PFA (perfluoroalkylvinylether copolymer) for operating temperatures up to about 250° C. or of another fluoropolymer—and by means of an injection molding process. The outflow opening 40 thus has a precisely predetermined geometry. If a value is chosen for the diameter of the outflow opening 40 which is greater than the thickness of the base 42, then the outflow conditions are easily reproducible; in addition, the amount of liquid flowing through can be calculated exactly.

The depression 41 of the entry-side part 4a, which extends up to a lower edge 43, has a shape corresponding to the aperture 30 in such a manner that practically no liquid can flow off along a contact surface between the depression 41 and the surface of the aperture 30. The lower region of tube 44 of the entry-side part 4a is formed as a cylindrical tube which has no contact with the surface of the aperture 30.

The fixing part 4b, which is likewise advantageously manufactured of an elastomer, can be pushed over the tube 44 of the entry-side part 4a (arrow 46'), with an elastically extensible circlip 45 surrounding the tube 44. Fine ribs 44a at the tube 44 in conjunction with a lower edge 45a of the circlip 45 result in a fixing. The fixing part 4b, which has a pot shaped shell 46, is pushed over the tub 44 to such an extent that the shell 46 lies under pressure with its upper edge 46a in contact with the outer side 32 of tub 3.

Plate shaped elements can be clamped in between the edge 46a and the outer side 32 of the tub 3. A non-illustrated element of this kind can be part of an auxiliary device, for example a baffle plate, which can be provided ahead of the opening of the tube 44.

Figure 3:
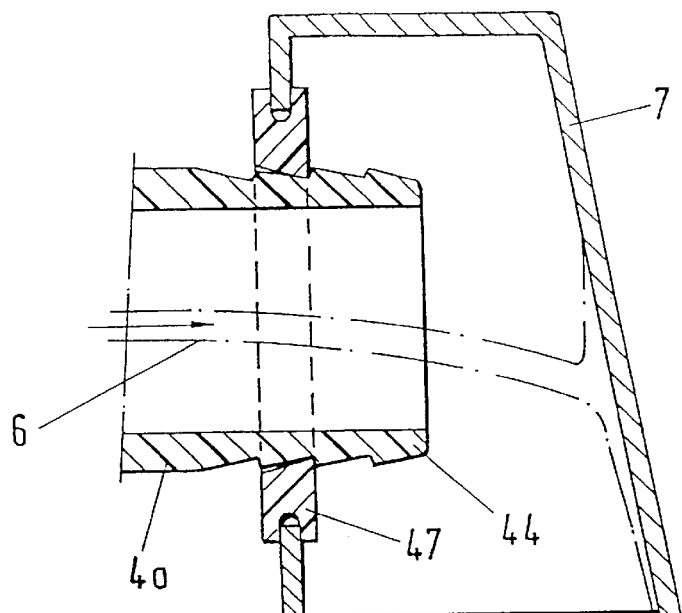
FIG. 3 is a baffle plate for a distributor in accordance with the invention.

FIG. 3 shows another baffle plate 7 for an outflow part 4b with an outlet-side tube 44. A liquid jet, such as a liquid 6 indicated in chain dotted lines, which flows horizontally out of an outlet aperture (40, cf. FIG. 2), is incident on the baffle plate 7 and flows off downwardly there as a film 60. Here the baffle plate 7 is fastened with a circlip 47 just as the fixing part 4b in FIG. 2. This circlip 47 can be a part of a fixing of the outflow element or it can also be provided as an additional part in addition to a fixing part 4b. The baffle plate 7 can also be inclined with respect to the vertical in the reverse direction so that a gas flowing upwardly is hindered less.

Figure 4:
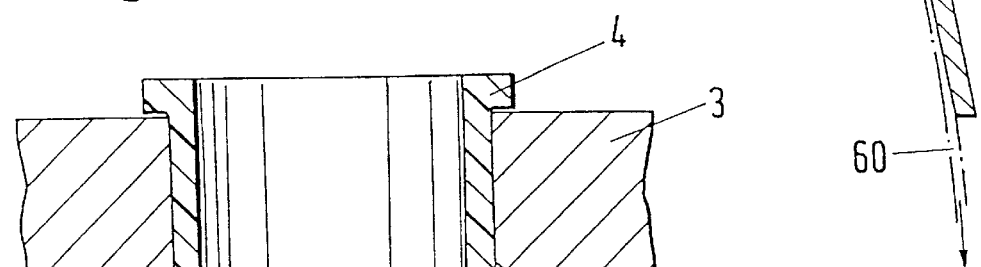
FIG. 4 is a single part outflow element.

A single piece outflow element 4 of an elastic material is illustrated in FIG. 4 which comprises fixing parts 44' by means of which the outflow element 4 is held without slippage in the aperture 30. An outflow element 4 of this kind can be used only when the geometry of the aperture can be precisely predetermined with an economical procedure.

Figure 5:
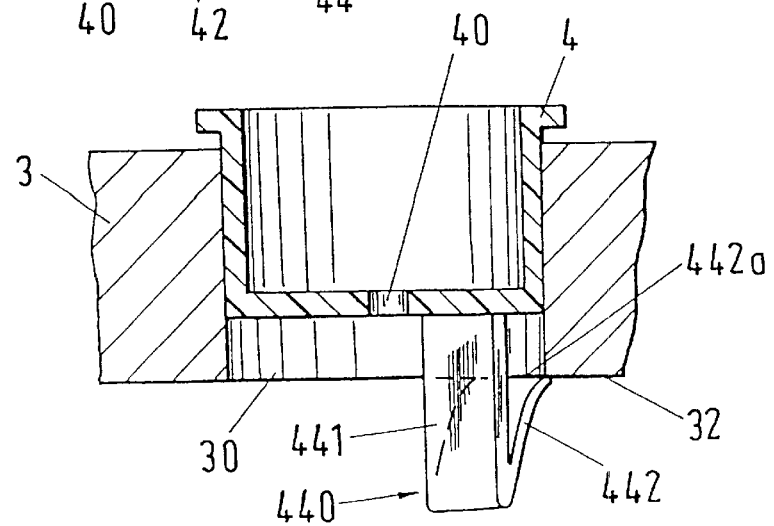
FIG. 5 is a further single part outflow element.

FIG. 5 shows a variant in which the fixing parts 440 are formed as elastic "barbs". The illustrated barb comprises a flank 441 with a flexible piece 442 which slides along the surface of the aperture 30 when being pushed in and then folds outwards. In this the upper edge 442a hooks in at the outer surface 32 of the tub 3.

Figure 6:
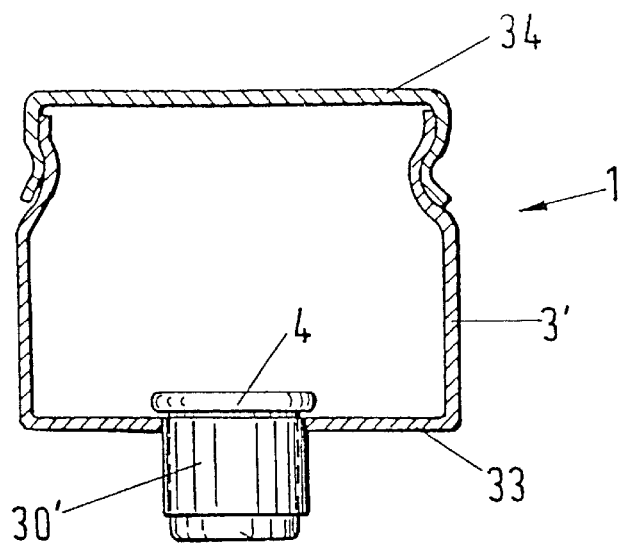
FIG. 6 is a cross-section through a distributor tube of metal.

The liquid distributor 1 in accordance with the invention—see FIG. 6—can also be installed in metallic distributor passages 3', which are for example formed in the shape of a tube and which comprise a tub shaped lower part 33, and a removable cover part 34. An outflow element 4, for example one in accordance with FIG. 4, is inserted into a cylindrical tube piece 30' of the lower tub shaped lower part 33.

Figure 7:
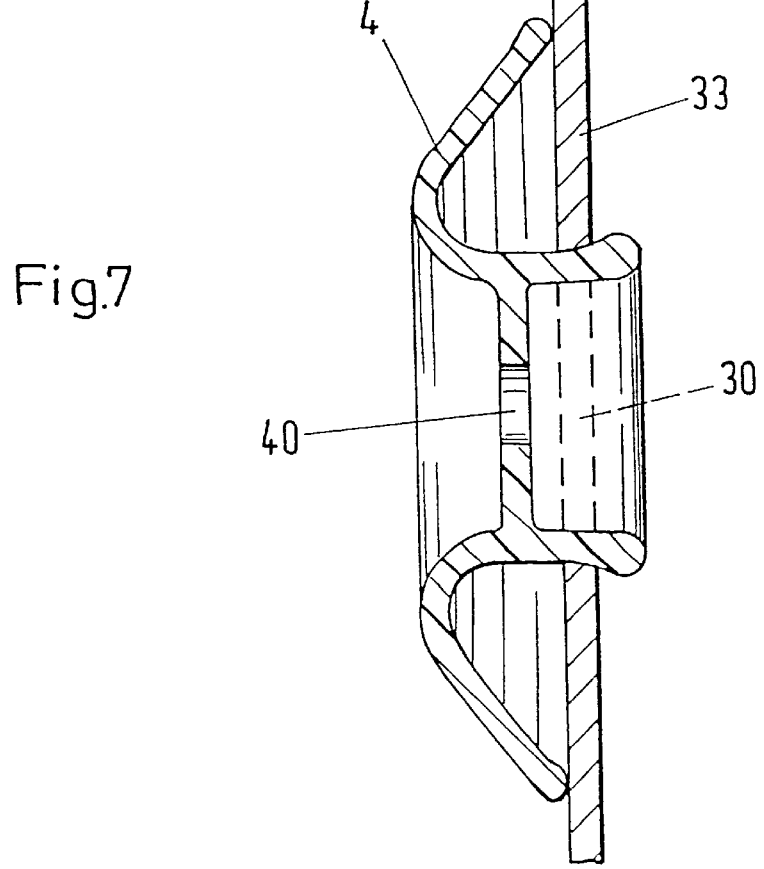
FIG. 7 is a cross-section through a further outflow element for a metallic distributor tube.

FIG. 7 shows a further exemplary embodiment of an outflow element 4 which can be inserted into a circular opening in a metallic distributor wall in tub shaped lower part 33. An outflow element 4 of this kind can be very simply and quickly replaced. As already mentioned above, this is advantageous in charge changes of the column since a replacement of the entire distributor is no longer necessary.

What is claimed is:

1. A liquid distributor for distributing a liquid into separation columns comprising:
   at least one tub shaped part of a rigid material defining a plurality of distributing cylindrical apertures from an interior of the at least one tub shaped part through a bottom of the at least one tub shaped part along outflow direction;
   a tubular outflow element of yielding, elastomeric material for each distributing aperture, each tubular outflow element having a pot shaped depression with a base having a thickness defining a single unobstructed outflow opening;
   the tubular outflow elements dimensioned for tight insertion of the pot shaped depression into the cylindrical apertures of the at least one tub shaped part whereby the liquid to be distributed can flow from the at least one tub shaped part into each distributing aperture by passing only through the one single unobstructed outflow opening; and
   the single unobstructed outflow opening in each tubular outflow element defining a repeated geometry with relation to single unobstructed outflow openings in adjacent tubular outflow elements whereby each distributing aperture has a repeated outflow of the liquid relative to other distributing apertures; and wherein
   the outflow elements are inserted into the distributing apertures;
   each single unobstructed outflow opening is arranged in the base; and
   each single unobstructed outflow opening has a diameter which is greater than the thickness of the base.

2. A liquid distributor in accordance with claim 1 wherein:
   each of the plurality of distributing cylindrical apertures of the at least one tub shaped part have cross-sections which change dimension normal to the outflow direction.

3. A liquid distributor in accordance with claim 1 wherein:
   the tubular outflow elements include fixing parts to provide a non-slipping seat for the tubular outflow elements in the apertures.

4. A liquid distributor in accordance with claim 3 wherein:
   the tubular outflow elements are in each case of a single piece and the fixing parts are integrated to an outflow side of said outflow elements.

5. A liquid distributor in accordance with claim 3 wherein:
   the tubular outflow elements are in each case assembled from an entry-side part and an outflow-side part force fitted over the entry-side part to capture the tubular outflow elements into distributing cylindrical apertures.

6. A liquid distributor for distributing a liquid into separation columns comprising:
   at least one tub shaped part of a rigid material defining a plurality of distributing cylindrical apertures from an interior of the at least one tub shaped part through a side of the at least one tub shaped part along outflow direction;
   a tubular outflow element of yielding, elastomeric material for each distributing aperture, each tubular outflow element having a pot shaped depression with a base having a thickness defining a single outflow opening;
   the tubular outflow elements dimensioned for tight insertion of the pot shaped depression into the cylindrical apertures in the side of the at least one tub shaped part whereby the liquid to be distributed can flow from the at least one tub shaped part into each distributing aperture by passing only through the one single outflow opening;
   the single outflow opening in each tubular outflow element defining a repeated geometry with respect to single outflow openings in adjacent tubular outflow elements whereby each distributing aperture has a repeated outflow of the liquid relative to other distributing apertures; and wherein
   the outflow elements are inserted into the distributing apertures;
   each single outflow opening is arranged in the base; and
   each single outflow opening has a diameter which is greater than the thickness of the base.

7. A liquid distributor in accordance with claim 6 wherein:
   baffle plates are arranged at a distance from the tubular outflow elements at an outlet side, with serial baffle plates being fastened by outflow-side parts to the tubular outflow elements.

8. In combination, a liquid separation column;

a liquid distributor for distributing a liquid into the separation column;

at least one tub shaped part of a rigid material defining a plurality of distributing cylindrical apertures from an interior of the at least one tub shaped part through a bottom of the at least one tub shaped part along outflow direction;

a tubular outflow element of yielding, elastomeric material for each distributing aperture, each tubular outflow element having a pot shaped depression with a base having a thickness defining a single unobstructed outflow opening;

the tubular outflow elements dimensioned for tight insertion of the pot shaped depression into the cylindrical apertures of the at least one tub shaped part whereby the liquid to be distributed can flow from the at least one tub shaped part into each distributing aperture by passing only through the one single unobstructed outflow opening;

the single unobstructed outflow opening in each tubular outflow element defining a repeated geometry with respect to single unobstructed outflow openings in adjacent tubular elements whereby each distributing aperture has a repeated outflow of the liquid relative to other distributing apertures; and wherein the outflow elements are inserted into the distributing apertures;

each single unobstructed outflow opening is arranged in the base; and each single unobstructed outflow opening has a diameter which is greater than the thickness of the base.

9. In the combination of claim 8 and wherein:

the column has structured packings defining a pattern under the liquid distributor; and tubular outflow elements are arranged in a pattern which is symmetrical to the structured packings defined pattern.

10. In the combination of claim 8 and wherein:

the liquid distributor distributes the liquid for heat exchange with a gas in the liquid separation column.

* * * * *